(12) United States Patent
Nichols

(10) Patent No.: US 7,808,626 B2
(45) Date of Patent: Oct. 5, 2010

(54) METHOD OF MOBILE RADIO POSITIONING AIDED BY SINGLE FAN SELF-SURVEYING LASER TRANSMITTER

(75) Inventor: Mark E. Nichols, Christchurch (NZ)

(73) Assignee: Trimble Navigation Ltd., Sunnyvale, CA (US)

( * ) Notice: Subject to any disclaimer, the term of this patent is extended or adjusted under 35 U.S.C. 154(b) by 331 days.

(21) Appl. No.: 12/002,636

(22) Filed: Dec. 17, 2007

(65) Prior Publication Data

US 2008/0192242 A1     Aug. 14, 2008

Related U.S. Application Data

(63) Continuation-in-part of application No. 11/010,224, filed on Dec. 11, 2004, now Pat. No. 7,310,137.

(51) Int. Cl.
*G01B 11/26* (2006.01)

(52) U.S. Cl. .................................. 356/139.01

(58) Field of Classification Search ........ 356/3.01–28.5
See application file for complete search history.

(56) References Cited

U.S. PATENT DOCUMENTS

| | | | | |
|---|---|---|---|---|
| 5,949,371 A * | 9/1999 | Nichols | ................. | 342/357.01 |
| 6,433,866 B1 * | 8/2002 | Nichols | .................. | 356/141.1 |
| 6,643,004 B2 | 11/2003 | Detweiler et al. | | |
| 6,870,608 B2 | 3/2005 | Detweiler et al. | | |
| 7,310,137 B2 * | 12/2007 | Nichols | ................. | 356/139.01 |
| 7,456,943 B1 * | 11/2008 | Goad et al. | ............ | 356/139.01 |
| 7,595,867 B2 * | 9/2009 | Nichols et al. | ......... | 356/139.01 |
| 2005/0099617 A1 * | 5/2005 | Ohtomo et al. | ............... | 356/11 |

* cited by examiner

*Primary Examiner*—Thomas H Tarcza
*Assistant Examiner*—Luke D Ratcliffe
(74) *Attorney, Agent, or Firm*—Boris G. Tankhilevich

(57) ABSTRACT

A method of mobile radio positioning aided by a single fan self-surveying laser transmitter (SF_SS_LT), wherein a rover comprises a mobile radio positioning system (Mobile_RADPS) integrated with a mobile laser detector; and wherein THE SF_SS_LT comprises a single fan laser transmitter and a positioning system integrated with the single fan laser transmitter. The method comprises: (A) performing self-surveying of the (SF_SS_LT); (B) generating a single fan laser beam by using the single fan laser transmitter; (C) detecting the single fan beam by using the mobile laser detector; and (D) timing the fan laser beam strike at the rover's location and using the timing of the fan laser beam strike at the rover's location to improve an accuracy in determination of position coordinates of the rover.

6 Claims, 3 Drawing Sheets

Timing Diagram for Laser Observations

Geometry of the Laser Beam and Observed Height Difference

METHOD OF MOBILE RADIO POSITIONING AIDED BY SINGLE FAN SELF-SURVEYING LASER TRANSMITTER

This is a continuation-in-part of the U.S. patent application Ser. No. 11/010,224, entitled "A SELF SURVEYING LASER TRANSMITTER", and filed on Dec. 11, 2004, now U.S. Pat. No. 7,310,137.

BACKGROUND OF THE INVENTION

1. Field of the Invention.

The current invention relates to position tracking and machine control systems, and, more specifically, to a combination of single fan laser systems and global navigation satellite systems configured to include self surveying capabilities in addition to having tracking and machine control capabilities.

2. Discussion of the Prior Art.

The parent patent application discloses a self-surveying laser transmitter comprising a laser transmitter configured to generate at least one rotating laser beam and a radio positioning system integrated with the laser transmitter. The radio positioning system was configured to obtain the precise coordinate measurements of the laser transmitter by utilizing the differential corrections transmitted from the Base Station by using the wireless communication link.

SUMMARY OF THE INVENTION

The present invention discloses a method of mobile radio positioning aided by a single fan self-surveying laser transmitter (SF_SS_LT), wherein a rover comprises a mobile radio positioning system (Mobile_RADPS) integrated with a mobile laser detector; and wherein the SF_SS_LT comprises a single fan laser transmitter and a positioning system integrated with the single fan laser transmitter.

In one embodiment, the method of mobile radio positioning of the present invention comprises: (A) performing self-surveying of a single fan self-surveying laser transmitter (SF_SS_LT); (B) generating a single fan laser beam by using the single fan laser transmitter; (C) detecting the single fan beam by using the mobile laser detector; and (D) timing the fan laser beam strike at the rover's location and using the timing of the fan laser beam strike at the rover's location to improve an accuracy in determination of position coordinates of the rover.

In one embodiment of the present invention, the step (A) further comprises: (A1) providing a stationary radio positioning system (RADPS) receiver integrated with the single fan laser transmitter, wherein the stationary RADPS receiver includes a stationary radio antenna; wherein the distance between a phase center of the stationary radio antenna and the single fan laser transmitter is known and fixed; (A2) providing a wireless communication device configured to receive a set of differential corrections data; and (A3) obtaining precise coordinate measurements of the single laser transmitter by using the stationary radio positioning system (RADPS) receiver configured to utilize the set of differential corrections data.

In one embodiment, wherein the SF_SS_LT further comprises a display unit, the method of mobile radio positioning of the present invention comprises: displaying the position coordinates of the implement; and controlling the movement of the implement.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE PREFERRED AND ALTERNATIVE EMBODIMENTS.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
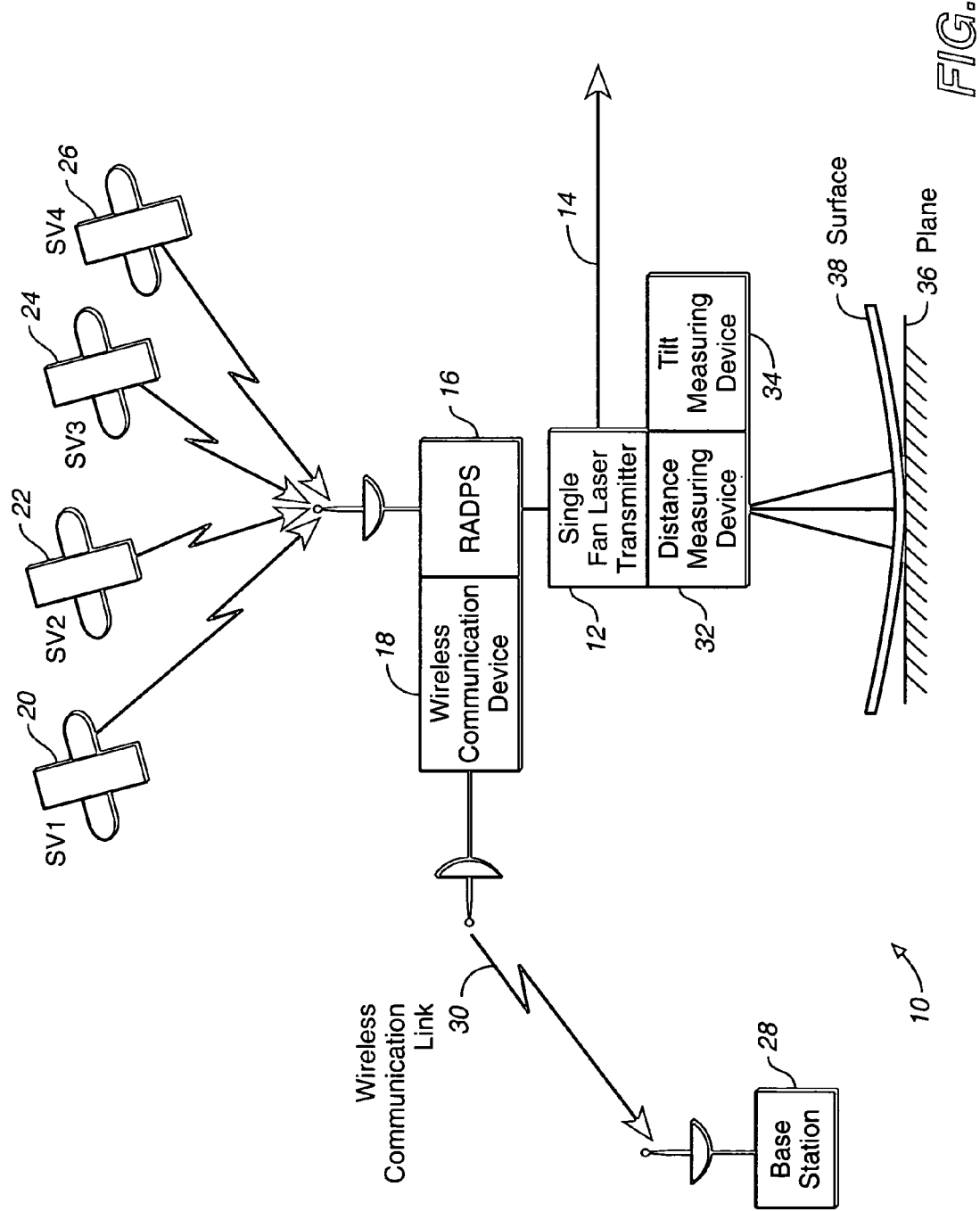
FIG. 1 depicts the single fan self-surveying laser transmitter (SF_SS_LT).

In one embodiment of the present invention, FIG. 1 depicts the single fan self-surveying laser transmitter (SF_SS_LT) 10 comprising: a single fan laser transmitter 12 configured to generate a single laser beam 14, a stationary radio positioning system (RADPS) receiver 16 integrated with the laser transmitter 12, and a wireless communication device 18. In this embodiment, the radio positioning system (RADPS) 16 is configured to obtain the coordinate measurements of the single fan laser transmitter 12.

The stationary radio positioning system (RADPS) receiver 16 integrated with the single fan laser transmitter 12 provides a number of benefits to a potential user comparatively with a system that mechanically combines a laser system and a RADPS receiver system. Indeed, the stationary radio positioning system (RADPS) receiver 16 integrated with the single fan laser transmitter 12 has the reduced cost as opposed to the cost of the combined laser and RADPS system because the integrated system requires only one set of packaging, can utilize a shared computer memory and can use a common power supply. In the integrated system the laser beam and the electrical phase center of the RADPS stationary antenna are separated by a known and fixed distance (not shown), wherein in the mechanically combined system the distance between the laser beam and the electrical phase center of the RADPS stationary antenna is prone to errors because this distance is introduced by an operator of the integrated system.

In one embodiment of the present invention, a 3-D laser station generates at least one rotating fan-shaped laser beam 14. The 3D Laser Station that generates at least one rotating fan-shaped laser beam is disclosed in U.S. Pat. Nos. 6,870,608 and 6,643,004. Both U.S. Pat. Nos. 6,870,608 and 6,643,004 are incorporated herein in their entirety.

Referring still to FIG. 1, the stationary radio positioning system (RADPS) receiver 16 can be selected from the group consisting of: {a GPS receiver; a GLONASS receiver; a combined GPS/GLONASS receiver; a GALILEO receiver; a Global Navigational Satellite System (GNSS) receiver; and a pseudolite receiver}.

The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system. ON more satellite-based navigation system is a GALILEO system.

Reference to a Satellite Positioning System or RADPS herein refers to a Global Positioning System, to a Global Orbiting Navigation System, to GALILEO System, and to any other compatible Global Navigational Satellite System (GNSS) satellite-based system that provides information by which an observer's position and the time of observation can be determined, all of which meet the requirements of the present invention, and to a ground based radio positioning system such as a system comprising of one or more pseudolite transmitters.

After the RADPS receiver determines the coordinates of the i-th RADPS satellite by demodulating the transmitted ephemeris parameters, the RADPS receiver can obtain the solution of the set of the simultaneous equations for its unknown coordinates ($x_0$, $y_0$, $z_0$) and for unknown time bias error (cb). The RADPS receiver can also determine velocity of a moving platform.

A pseudolite comprises a ground based radio positioning system working in any radio frequency including but not limited to the GPS frequencies and the ISM (industrial scientific medical) unlicensed operation band, including 900 MHZ, 2.4 GHz, or 5.8 GHz bands ISM bands, or in a radio location band such as the (9.5-10) GHz band. Pseudolites can be used for enhancing the GPS by providing increased accuracy, integrity, and availability.

The complete description of the pseudolite transmitters in GPS band can be found in "Global Positioning System: Theory and Applications"; Volume II, edited by Bradford W. Parkinson and James J. Spilker Jr., and published in Volume 164 in "PROGRESS IN ASTRONAUTICS AND AERONAUTICS", by American Institute of Aeronautics and Astronautics, Inc., in 1966.

In ISM band, including 900 MHZ, 2.4 GHz, or 5.8 GHz bands, the user can own both ends of the ISM communication system. The ISM technologies are manufactured by Trimble Navigation Limited, Sunnyvale, Calif. Metricom, Los Gatos, Calif. and by Utilicom, Santa Barbara, Calif.

Pseudolites as radio positioning systems can be configured to operate in ISM band.

The following discussion is focused on a GPS receiver, though the same approach can be used for a GLONASS receiver, for a GPS/GLONASS combined receiver, GALILEO receiver, or any other RADPS receiver.

In one embodiment, the RADPS receiver 16 (of FIG. 1) can comprise a differential GPS receiver. In differential position determination, many of the errors in the RADPS signals that compromise the accuracy of absolute position determination are similar in magnitude for stations that are physically close. The effect of these errors on the accuracy of differential position determination is therefore substantially reduced by a process of partial error cancellation. Thus, the differential positioning method is far more accurate than the absolute positioning method, provided that the distances between these stations are substantially less than the distances from these stations to the satellites, which is the usual case. Differential positioning can be used to provide location coordinates and distances that are accurate to within a few centimeters in absolute terms. The differential GPS receiver can include: (a) a real time code differential GPS; (b) a post processing differential GPS; (c) a real-time kinematic (RTK) differential GPS that includes a code and carrier RTK differential GPS receiver.

The differential GPS receiver can obtain the differential corrections from different sources.

Referring still to FIG. 1, in one embodiment of the present invention, the differential GPS receiver 16 can obtain the differential corrections from a Base Station 28.

The fixed Base Station (BS) placed at a known location determines the range and range rate measurement errors in each received GPS signal and communicates these measurement errors as corrections to be applied by local users. The Base Station (BS) has its own imprecise clock with the clock bias $CB_{BASE}$. As a result, the local users are able to obtain more accurate navigation results relative to the Base Station location and the Base Station clock. With proper equipment, a relative accuracy of 5 meters should be possible at distances of a few hundred kilometers from the Base Station.

Referring still to FIG. 1, in another embodiment of the present invention, the differential GPS receiver 16 can be implemented by using a TRIMBLE Ag GPS –132 receiver that obtains the differential corrections from the U.S. Coast Guard service free in 300 kHz band broadcast by using the wireless communication device 18 and the wireless communication link 30. In this embodiment, the self-surveying laser transmitter 12 integrated with the differential GPS receiver 16 should be placed within (2-300) miles from the U.S. Coast Guard Base Station. The accuracy of this differential GPS method is about 50 cm.

Referring still to FIG. 1, in one embodiment of the present invention, the differential corrections can be obtained from the Wide Area Augmentation System (WAAS) by using the wireless communication device 18 and the wireless communication link 30. The WAAS system includes a network of Base Stations that uses satellites (initially geostationary satellites-GEOs) to broadcast GPS integrity and correction data to GPS users. The WAAS provides a ranging signal that augments the GPS that is the WAAS ranging signal is designed to minimize the standard GPS receiver hardware modifications. The WAAS ranging signal utilizes the GPS frequency and GPS-type of modulation, including only a Coarse/Acquisition (C/A) PRN code. In addition, the code phase timing is synchronized to GPS time to provide a ranging capability. To obtain the position solution, the WAAS satellite can be used as any other GPS satellite in satellite selection algorithm. The WAAS provides the differential corrections free of charge to a WAAS compatible user. The accuracy of this method is better than 1 meter.

Referring still to FIG. 1, in one embodiment of the present invention, the real time kinematic (RTK) differential GPS receiver 16 can be used to obtain the position locations with less than 2 cm accuracy. The RTK differential GPS receiver receives the differential corrections from the Base Station 28 placed in a known location within (10-50) km by using the wireless communication device 18 and the wireless communication link 30. For a high accuracy measurement, the number of whole cycle carrier phase shifts between a particular GPS satellite and the RTK GPS receiver is resolved because at the receiver every cycle will appear the same. Thus, the RTK GPS receiver solves in real time an "integer ambiguity" problem that is the problem of determining the number of whole cycles of the carrier satellite signal between the GPS satellite being observed and the RTK GPS receiver. Indeed, the error in one carrier cycle L1 (or L2) can change the measurement result by 19(or 24) centimeters, which is an unacceptable error for the centimeter level accuracy measurements.

Referring still to FIG. 1, in one embodiment of the present invention, the differential corrections can be obtained by the RADPS receiver 16 from the Virtual Base Station (VBS) 28 by using the wireless communication device 18 and the wireless communication link 30.

Indeed, the Virtual Base Station (VBS) is configured to deliver a network-created correction data to a multiplicity of rovers via a concatenated communications link consisting of a single cellular connection, and a radio transmission or broadcasting system. The location of the radio transmitting system can be co-located with a GPS Base Station designated as the position of the local Virtual Reference Station. This GPS Base Station determines its position using GPS, and transmits its location to the VRS Base Station via a cellular link between the local GPS Base Station and the VRS Base Station. It enables the VRS Base Station to generate differential corrections as if such differential corrections were actually being generated at the real GPS Base Station location. These corrections can be delivered to the self-surveying laser transmitter 12 by using a wireless communication link 30 and wireless communication device 18.

An article "Long-Range RTK Positioning Using Virtual Reference Stations," by Ulrich Vollath, Alois Deking, Herbert Landau, and Christian Pagels, describing VRS in more details, is incorporated herein as a reference in its entirety, and can be accessed at the following URL: http://trl.trimble.com/dscgi/ds.py/Get/File-93152/KIS2001-Paper-LongRange.pdf.

Referring still to FIG. 1, in one embodiment of the present invention, the wireless communication link 30 can be implemented by using a variety of different embodiments.

In general, the wireless communication link 30 (of FIG. 1) can be implemented by using a radio wave frequency band, an infrared frequency band, or a microwave frequency band. In one embodiment, the wireless communication link can include the ISM band, including 900 MHZ, 2.4 GHz, or 5.8 GHz bands, wherein the user can own both ends of the ISM communication system.

In one embodiment of the present invention, the wireless communication link 30 (of FIG. 1) can be implemented by using the Trimble SiteNet® 900 private radio network. The Trimble SiteNet® 900 private radio network is a rugged, multi-network, 900 MHz radio modem designed specifically for the construction and mining industries. It is used to establish robust, wireless data broadcast networks for real-time, high-precision GPS applications. This versatile Trimble radio operates in the frequency range of 902-928 MHz, broadcasting, repeating, and receiving real-time data used by Trimble GPS receivers. Under optimal conditions, the SiteNet 900 radio broadcasts data up to 10 km (6.2 miles) line-of-sight and coverage can be enhanced by using a network of multi-repeaters. Using the SiteNet 900 radio as a repeater, enables one to provide coverage in previously inaccessible or obstructed locations. The SiteNet 900 radio is so versatile, that one can easily change its operating mode to suit any network configuration. This reduces costs and maximizes uptime. Additionally, SiteNet 900 is license free in the U.S.A. and Canada, which makes it extremely portable. One can move it from project to project without licensing hassles and restrictions. The SiteNet 900 radio is designed to operate reliably in demanding RF environments where many other products and technologies cannot. Optimized for GPS with increased sensitivity and jamming immunity, the SiteNet 900 radio also has error correction, and a high-speed data rate, ensuring maximum performance. The SiteNet 900 radio is especially suited for use with Trimble's SiteVision® GPS grade control system, and is ideal for all GPS machine control applications where reliability is important. The machine-rugged unit has been designed and built especially for harsh construction and mining environments. Fully sealed against dust, rain, splash, and spray, the SiteNet 900 radio remains reliable in all weather. The radio's ruggedness and reliability minimizes downtime, lowering ownership costs. Trimble's SiteNet 900 radio can be used with any Trimble GPS receiver, including: MS750, MS850, MS860, and 5700 receivers.

In one embodiment of the present invention, the wireless communication link 30 (of FIG. 1) can be implemented by using a 1.8 GHz band that supports the personal communications services (PCS). The PCS uses the international standard DCS-1800. Yet, in one more embodiment, the wireless communication link can include a real time circuit switched wireless communication link. For instance, the wireless communication link employing a real time circuit switched wireless communication link can include the Iridium satellite system produced by Motorola, Schaumburg, Ill.

In one additional embodiment, the wireless communication link can be implemented by using a system of Low Earth Orbiting Satellites (LEOS), a system of Medium Earth Orbiting Satellites (MEOS), or a system of Geostationary Earth Orbiting Satellites (GEOS) which can be used to store and to forward digital packet data. For instance, the LEOS systems in (20-30) GHz range are manufactured by Cellular Communications located in Redmond, Wash., and the LEOS systems in (1.6-2.5) GHz range are produced by Loral/Qualcomm located in San Diego, Calif.

The wireless communication link can include a cellular telephone communication means, a paging signal receiving means, wireless messaging services, wireless application services, a wireless WAN/LAN station, or an Earth-satellite-Earth communication module that uses at least one satellite to relay a radio wave signal. The wireless communication link can also include the cellular telephone communication means that can include an Advanced Mobile Phone System (AMPS) with a modem. The modem can comprise a DSP (digital signal processor) modem in 800 MHz range, or a cellular digital packet data (CDPD) modem in 800 MHz range. The cellular digital communication means includes a means of modulation of digital data over a radio link using a time division multiple access (TDMA) system employing format IS-54, a code division multiple access (CDMA) system employing format IS-95, or a frequency division multiple access (FDMA). The TDMA system used in Europe is called groupe special mobile (GSM) in French.

For the purposes of the present invention, a cellular telephone communication means can be used to get a wireless access to the Internet in order, for example, to broadcast the real time coordinates of the self-surveying laser transmitter position on a special web-site.

Referring still to FIG. 1, the wireless communication device 18 can be implemented by using any of devices that can be configured to provide: {a cellular link; a radio link; a private radio band link; a SiteNet 900 private radio network link; a link to the wireless Internet; and a satellite wireless communication link}. A person skillful in the art can easily identify all these devices. Please, see the discussion above.

In one embodiment of the present invention, the wireless communication device 18 is configured to respond to specific requests from a mobile equipment (not shown) transmitted over the wireless communication link 30.

Referring still to FIG. 1, in one embodiment of the present invention, the laser transmitter 12 comprises a fan laser transmitter configured to generate a single fan laser beam 14 that rotates continuously about a vertical axis at a uniform rate above a known stationary point in the plot of land.

Referring still to FIG. 1, in one embodiment, the apparatus of the present invention 10 further comprises a distance measuring device 32 integrated with the single fan laser transmitter 12 and integrated with the RADPS receiver 16. In this embodiment, the distance measuring device 32 is configured to measure the distance between the phase center of the stationary radio antenna (not shown) and a known point or reference plane 36 over which the single fan self-surveying laser transmitter (SF_SS_LT) is positioned in order to determine the position coordinates of the single laser transmitter in relation to the known point or reference plane.

The GlobalSpec Inc., located at 350 Jordan Rd, Troy, N.Y., 12180, manufactures a wide range of Electronic Distance Measurement (EDM) tools that can be used to implement the distance measurement device 32. More specifically, a special laser "gun" beam can be used to measure very precisely the time it takes for a laser beam to make the round-trip from the "gun" to the reflectors, and back. Using this time, the known speed that the laser travels (the speed of light), and correcting for air temperature and pressure, the distance can be determined to a precision of 1 part per million (i.e. 1 mm over a distance of 1 km).

Referring still to FIG. 1, in one embodiment, the apparatus of the present invention 10 further comprises a tilt angle measurement device 34 integrated with the single laser transmitter 12 and integrated with the RADPS receiver 16. In this embodiment, the tilt measurement device 34 is configured to perform tilt coordinates measurements of the phase center of the stationary radio antenna (not shown) in relation to the known reference surface over which the single fan self-surveying laser transmitter (SF_SS_LT) is positioned in order to determine the position coordinates of the single laser transmitter 12 in relation to the known reference surface 38.

In one embodiment, the tilt angle measurement device 34 further comprises an electronic tilt measurement device. The Precision Navigation, Inc., (PNI) based in Mountain View, Calif. manufactures TCM2 Electronic Compass Sensor Module. TCM2 is a high-performance, low-power electronic compass sensor that offers compass heading, pitch and roll through an electronic interface to host system. This high end system provides a robust heading reference system that can be easily integrated with a GPS navigational system. The Precision Navigation, Inc., (PNI) also manufactures a low end, low cost Vector-VR Head Positioning Sensor that provides a 3 DOF attitude sensor whose combination of tilt-performance, low-power, and low-cost makes it ideally suited for tilt-measurement applications.

Figure 2:
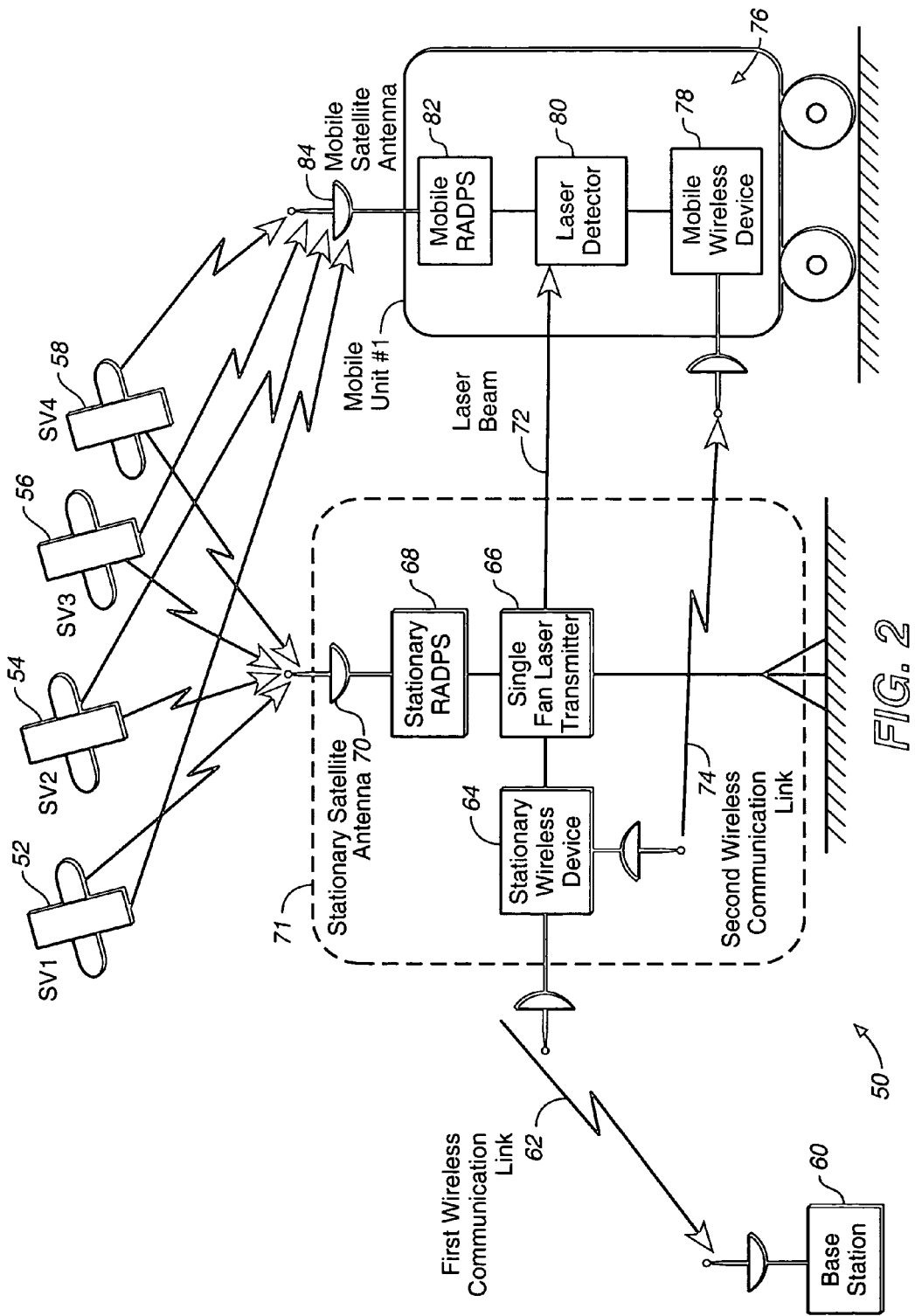
FIG. 2 illustrates the single fan self-surveying laser transmitter (SF_SS_LT) and at least one mobile unit including a laser detector and a mobile radio positioning system (RADPS) receiver.

In one embodiment of the present invention, FIG. 2 illustrates the single fan self-surveying laser transmitter (SF_SS_LT) 71, a first wireless communication link 62, a stationary wireless communication device 64 configured to receive a set of differential corrections data by using the first wireless communication link 62, at least one mobile unit 76 including a laser detector 80 and a mobile radio positioning system (RADPS) receiver 82, and at least one second wireless communication link 74.

At least one second wireless communication link 74 is used to substantially continuously transmit to at least one mobile unit 76 the precise coordinate measurements of the single fan laser transmitter 66 and the set of differential corrections obtained by the stationary RADPS receiver 68. At least one mobile RADPS receiver 82 utilizes the differential corrections to obtain the precise coordinate measurements of the mobile unit 76 via the second wireless communication link 74.

The mobile RADPS receiver 82 is selected from the group consisting of: {a GPS receiver; a GLONASS receiver; a combined GPS/GLONASS receiver; a GALILEO receiver; a Global Navigational Satellite System (GNSS) receiver; and a pseudolite receiver}.

In one embodiment, the stationary RADPS 68 and the mobile RADPS 82 are selected to include the same satellite receiver configured to receive the same satellite signals.

EXAMPLE I

Both the mobile RADPS receiver 82 and the stationary RADPS receiver 68 are selected to include a GPS receiver configured to receive the satellite signals from the GPS satellite-vehicles SV1 52, SV2 54, SV 56, and SV 58.

The second wireless communication link 74 can be implemented by using a the same vehicles as the first wireless link 62, for instance, a cellular link; a radio link; a private radio band link; a SiteNet 900 private radio network link; a link to the wireless Internet; and a satellite wireless communication link.

EXAMPLE II

The first wireless communication link 62 is implemented by using a cellular phone link to connect to Virtual Base Station, whereas the second wireless communication link is implemented by using a SiteNet 900 private radio network link.

Referring still to FIG. 2, the single fan laser transmitter 66 generates a single fan-beam 72. In one embodiment of the present invention, the beam is rotated about a vertical axis at a very constant angular rate 4 rad/s. The frequency of rotation is given by f (Hz), while the period of rotation is T seconds. The following relationship exists between the angular parameters:

$$\omega = \frac{2\pi}{T} = 2\pi \times f \quad [\text{rad/s}] \quad (1)$$

The laser transmitter 66 head (not shown) is rotated within good bearings and is driven by a motor which is phase oscillator locked. Furthermore, the laser transmitter head is given sufficient mass to enhance the constant rotation rate of the fan-beam. The present rotation rate is 40 to 50 Hz.

An electronic timing pulse is generated every time the center of the laser beam 72 passes a zero direction mark (not shown) in the laser transmitter 66. The timing pulse is accurately (typically to within 40 nanoseconds) time tagged within the position coordinates of the transmitter 66 (determined by the Stationary_RADPS 68) and is denoted $\tau$.

The rotating rate of the laser is typically 50-60 Hz. A low-passed filtered estimate of the spin rate can be readily generated from the zero-direction crossing times. This information is then transmitted to the rover unit 76 using the wireless device 64 via the second wireless data link 74 that is preferably also used for the RADPS differential angular rate data.

It will be shown later that variations in the spin rate of the laser directly impact on the accuracy of height estimates of the rover 76. Apart from careful manufacture of the rotating laser head, it is possible to comprise additional timing marks at say every $\pi/4$ radians of rotation where RADPS time stamps are made. Differences between the observed and expected time-tags at the $\pi/4$; $\pi/2$; $3\pi/4$ reference points provide a laser correction mechanism for users of the laser signals.

The zero direction crossing times are sent to the rover 76 via the second wireless communication link 74. If necessary, additional rotation rate variation parameters can also be comprised.

In one embodiment of the present invention, the rover unit 76 is mounted on a mast (not shown) for machine control applications or on a portable pole (not shown) for hand-held construction setup etc, or on the cab of a machine. The rover 76 includes an integrated laser detector 80 and Mobile_RADPS receiver 82 that tracks radio (or satellite signals). The laser detector 80 is capable of detecting the light pulse generated by the single fan laser transmitter 66. The leading and/or trailing edge of the pulse are time-stamped using the Mobile_RADPS receiver 82 to accuracy better than 100, typically about 40 nanoseconds.

In one embodiment of the present invention, as was disclosed above, the Mobile_RADPS receiver 82 comprises a differential Mobile_RADPS receiver that receives differential corrections from any other source of the differential correction stream.

In one embodiment of the present invention, the differential Mobile_RADPS receiver is capable of computing its location relative to the laser transmitter 66 to within a few centimeters using real-time kinematic (RTK) techniques. However, the precision of the height component of the rover is appreciably worse with RADPS techniques compared with the laser positioning.

In one embodiment of the present invention, the height of the rover (not shown) is determined at the rover's location by using the laser detector 80 according to the following procedure.

Figure 3:
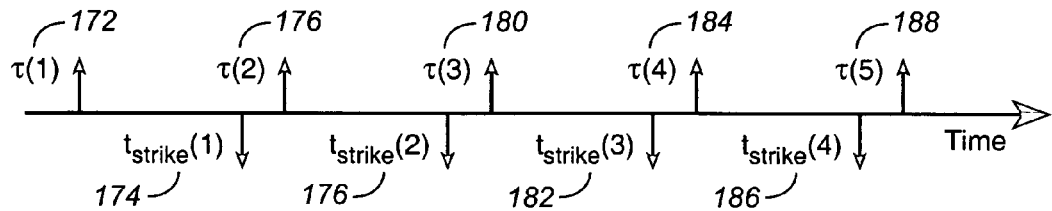
FIG. 3 is a timing diagram that illustrates how a low-passed filtered estimate of the single fan laser transmitter rotation rate is first generated by using the time series of zero crossings.

At the first step, as shown in FIG. 3 in timing diagram 170, a low-passed filtered estimate of the laser transmitter 66 rotation rate is first generated using the time series of zero crossings:

T(1)172; T(2)176; T(3)180; T(4)184; T(5)188; T(n)

The timing diagram 170 also illustrates the timings of laser strikes $t_{strike}$(1) 174, $t_{strike}$(2) 176, $t_{strike}$(3) 182, and $t_{strike}$(4) 186 at the laser detector's location. Let $f_{filt}$ be the low-passed filtered rotation frequency, and $T_{filt}$ be the corresponding period of rotation.

At the next step, the laser detector 80 is configured to measure the time difference between the received laser pulse (strike) and the last zero crossing time:

$$t_{dif}(i)=t_{strike}(i)-\tau(i); \quad (2)$$

where:

$t_{dif}(i)$ is the difference between the laser strike time at epoch i and the corresponding zero crossing time;

$\tau(i)$ is the time of the zero crossing for epoch i;

$t_{strike}(i)$ is the time of the laser strike at epoch i.

In practice, laser strikes may be received prior to knowing the last zero crossing time. This delay is due mainly to the time taken to time-stamp the zero crossing times and broadcast and receives them. Eq. (2) can be modified according to:

$$t_{dif}(i)=t_{strike}(i)-[\tau(i-m)+T_{filt}\times m]; \quad (3)$$

where:

$\tau(i-m)$ is the zero cross time m-rotations ago, $T_{filt}$ is the low-passed filtered rotation period (in seconds), m are an integer number of rotations.

At the next step, the Mobile_RADPS receiver 82 determines the horizontal and vertical rover's location relative to the laser transmitter 66 to within a few centimeters. The azimuth of the rover unit is then derived from:

$$\alpha = \tan^{-1}\left(\frac{E_T - E_R}{N_T - N_R}\right). \quad (4)$$

In an actual system, one would allow an orientation of the laser transmitter to be arbitrary and the reference orientation can be determined from the measured laser azimuth angle and the GPS vector from the stationary to the mobile RADPS.

However, at the following step, assuming the laser transmitter 66 is aligned to true north, and that the laser transmitter 66 and rover 76 are at the same height, then the laser strike time will be given by:

$$t_\alpha(i)=\tau(i)+\alpha(i)\times\omega; \quad (5)$$

where:

$t_\alpha(i)$ is the expected laser strike time for the rover at azimuth, and at the same height as the transmitter; $\alpha$ (i) is the azimuth of the rover relative to the transmitter at epoch i; 107 is the angular rate of rotation of the transmitter head, as defined in Eq. (1).

At the next step, one assumes that, in general, the rover 76 will lie above or below the height of the laser transmitter 66. If this is the case, the actual laser strike time will differ from that obtained in Eq. (5). It is this time difference, $t_{obs}$, which enables one to precisely compute the height of the rover 76, where:

$$t_{obs}(i)=t_{strike}(i)-t_\alpha(i). \quad (6)$$

Figure 4:
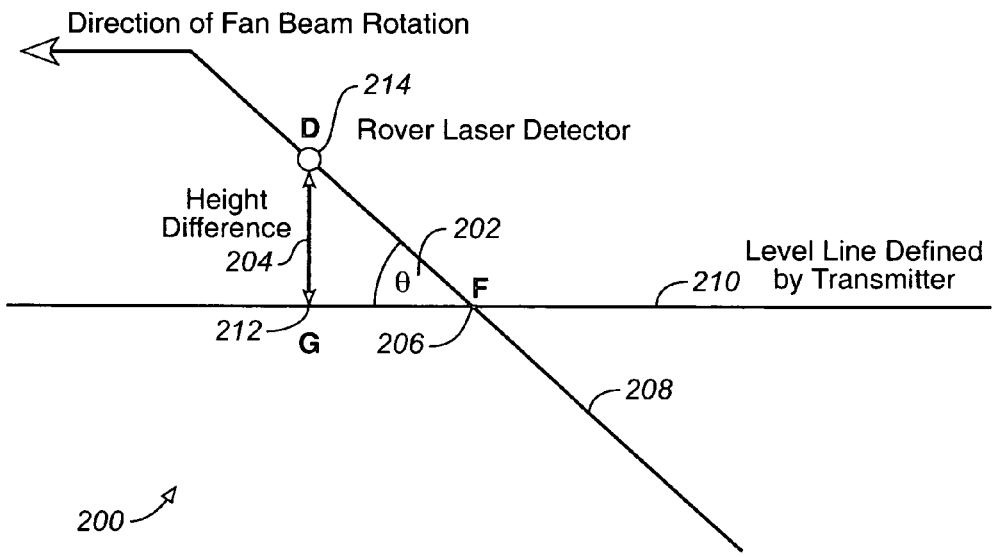
FIG. 4 illustrates the geometry of the laser beam and observed height difference.

FIG. 4 is a diagram 200 that illustrates the geometry of the laser beam and observed the height difference 204. More specifically, the diagram 200 illustrates the view looking back towards the laser transmitter 66 (of FIG. 2) from outside the rover 76 (of FIG. 2). The fan beam 72 is inclined at an angle, θ radians, 202, as shown. Let point F 206, be the intersection of the fan-beam 208, a horizontal plane at the height of the transmitter 210, and the vertical plane containing the laser detector (D) 214. Point G 212, is vertically beneath D 214 and in the same plane as F 206. The observed time difference $t_{obs}$, described in Eq. (6) can be converted to an equivalent angle subtended at the laser transmitter via:

$$\phi(i) = \omega \times t_{obs}(i). \quad (7)$$

The position coordinates of the rover are interpolated position coordinates interpolated between position coordinates taken at GPS time Epoch immediately preceding the laser strike and position coordinates taken at GPS time Epoch immediately after the laser strike.

The described above height determination process is affected by a number of parameters. It is useful to analyze the impact of the uncertainty in each parameter on the height difference. With this knowledge, it is possible to optimize the system design.

In one embodiment of the present invention, the position coordinates of the implement can be determined with improved accuracy as was disclosed above. Therefore, the movement of the implement can be controlled, which could be important in certain applications. The implement is selected from the group consisting of: {a blade or a bucket on an earthmoving machine; an agricultural implement; and a device connected to a machine, wherein the device's location is being controlled}.

If RADPS device 68 (of FIG. 2) if it is equipped with the display device (not shown), the movement of the mobile unit 76 and the movement of the implement (not shown) can be displayed on the display device.

The foregoing description of specific embodiments of the present invention has been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of mobile radio positioning aided by a single fan self-surveying laser transmitter (SF_SS_LT), wherein a rover comprises a mobile radio positioning system (Mobile_RADPS) integrated with a mobile laser detector; and wherein said SF_SS_LT comprises a single fan laser transmitter and a positioning system integrated with said single fan laser transmitter; wherein said positioning system is configured to obtain the coordinate measurements of said single fan laser transmitter; said method comprising:

(A) performing self-surveying of said (SF_SS_LT);
   (B) generating a single fan laser beam by using said single fan laser transmitter;
   (C) detecting said single fan beam by using said mobile laser detector;
   (D1) measuring the time difference between the time instance when said light pulse corresponding to said single sloping fan laser beam strike at said rover's location is received and the latest main reference crossing time corresponding to the time instance when said known position of said laser beam passes said main reference mark at the location of said laser transmitter; and (D2) calculating a height of said rover with improved accuracy based on position coordinates of said rover and based on said time difference measured at said step (D1), wherein said position coordinates of said rover are interpolated position coordinates interpolated between position coordinates taken at GPS time Epoch immediately preceding said laser strike and position coordinates taken at GPS time Epoch immediately after said laser strike.

2. The method of claim 1, wherein said step of (D2) further comprises:

(D2, 1) providing a differential mobile radio positioning system (Mobile_RADPS);
   (D2, 2) receiving a second plurality of external radio signals broadcasted by at least one radio source selected from the group consisting of: GPS; GLONASS; combined GPS/GLONASS; GALILEO; Global Navigational Satellite System (GNSS); and a pseudolite transmitter by using said differential mobile radio positioning system (Mobile_RADPS); and
   (D2, 3) receiving a second set of differential corrections data broadcasted by at least one source selected from the group consisting of: a Base Station, an RTK Base Station; a Virtual Base Station (VBS); and a pseudolite transmitter by using said differential mobile radio positioning system (Mobile_RADPS);
   wherein said differential mobile radio positioning system (Mobile_RADPS) is configured to utilize said second plurality of external radio signals and said second set of differential corrections data to obtain position coordinates of said rover.

3. The method of claim 1 further comprising:
   (D3) optimizing said improved height calculation of said rover.

4. The method of claim 3, wherein said step (D3) further comprises:
   (D3, 1) calculating a set of sensitivity parameters selected from the group consisting of: a partial derivative of said rover's height with respect to a laser beam rotation frequency; a partial derivative of said rover's height with respect to a horizontal distance from said rover to said laser transmitter; a partial derivative of said rover's height with respect to a time difference between said actual laser strike time and said expected laser strike time; and a partial derivative of said rover's height with respect to a vertical angle.

5. The method of claim 3, wherein said step (D3) further comprises:
   (D3, 2) calculating said variable laser beam rotation frequency by using said plurality of time tags corresponding to time-tagging of said laser beam to each said additional reference mark at said laser transmitter location.

6. The method of claim 1 further comprising:
   (D4) calibrating said improved height calculation of said rover for planar errors affecting the planarity of said single fan beam.

* * * * *